3,320,181
HYDROCARBON CONVERSION CATALYSTS COMPRISING MOLYBDENUM SULFIDE AND NICKEL SULFIDE DISPERSED WITHIN ALUMINA
Paul E. Fischer, Berkeley, Waldeen C. Buss, Pinole, and Edwin A. Goldsmith, Oakland, Calif., assignors to Chevron Research Company, a corporation of Delaware
No Drawing. Filed Jan. 30, 1964, Ser. No. 341,399
2 Claims. (Cl. 252—439)

This invention relates to a method for preparing gel catalysts comprising molybdenum sulfide and nickel sulfide microscopically dispered within alumina, said catalysts being particularly useful for catalyzing hydrodenitrification and/or hydrocracking reactions.

As is well known to those skilled in the catalyst art, a gel, including both xerogels or aerogels, is produced by dehydration, generally by heating, of a hydrogel which is herein defined as a solid material containing both the solid phase of a colloidal solution and the imbibed liquid phase. It is also well known that metal oxide-containing gels have long been employed as catalysts and/or catalyst supports. Numerous methods of making such composites have been suggested, most of which have been directed to the particular components of the initial gel, the manner of forming the gel, and in various techniques for removing undesirable components from the formed gel. The present invention is directed to a specific method for making catalysts of particular compositions, namely, gel catalysts containing, as necessary components, nickel sulfide and molybdenum sulfide microscopically dispersed within an alumina gel.

The method for preparing the catalyst of the present invention comprises the following steps:

(a) Forming a solution comprising nickel chloride, molybdenum pentachloride and aluminum chloride, (b) Adding to said solution from about 1.0 to 5.0 mols of at least one oxirane containing from 2 to 3 carbon atoms per molecule per mol of chloride ion in said solution, thereby forming a hydrogel, (c) Dehydrating said hydrogel to a gel by the steps comprising:

(1) Partially drying said hydrogel at a temperature below about 400° F., (2) Contacting the partially dried hydrogel, at progressively increasing temperatures, with heated hydrogen in the absence of a sulfur-containing compound to a temperature in the range of from about 800 to about 1150° F., thereby completing the dehydration, and (d) Contacting the alumina-molybdenum-nickel-containing compound with hydrogen and a sulfur-containing compound at elevated temperatures to convert a substantial portion of the nickel and molybdenum components to their corresponding sulfides.

As a requisite to the present method, it is necessary that the three noted components be cogelled simultaneously. Thus, cogellation of two components to produce a gel and thereafter impregnating a third component upon the gel is outside the contemplation of this invention. It has been found that catalysts produced by simultaneous cogellation are very much superior to multi-component catalysts produced by other methods such as by impregnation of a single oxide support, or even those made by impregnating a third component on a coprecipitated two-component carrier. This marked superiority has been exemplified in a comparison of numerous catalysts. For example, the molybdenum sulfide, nickel sulfide, alumina catalyst prepared according to the present method has been found to possess superior catalyst activities in both hydrodenitrification and hydrocracking than catalysts of the exact composition prepared by sequentially impregnating an alumina support with nickel and molybdenum compounds and thereafter converting the molybdenum and nickel components to their corresponding sulfides. The reason for this superiority is not completely understood but it is believed that the intimate uniform dispersion of the components, and/or compound formation, that probably exists throughout the hydrogel, and thus the gel, produced by the present method, leads to these improved results. Because of this dispersion, the hydrogel is herein referred to as a microgel, and the gel formed therefrom called a dried microgel.

The first step in preparing catalysts according to the present invention requires the formation of an aqueous, or alcohol, or mixed aqueous-alcoholic solution containing aluminum chloride, nickel chloride, and molybdenum pentachloride. Since all of these components are well known articles of commerce, no description other than their designation is needed, except that it is desirable that these chemical compounds be of relatively high purity.

Wide ranges of varying concentrations of the metal compounds in the hydrogel can be produced by the subject process by merely regulating the amount of each metal compound in the initial solution. The relative concentrations of the metal chlorides in the hydrogel are only dependent upon the concentration actually desired by the producer. Although it is possible that a tremendous number of possible compositions of nickel and molybdenum compounds within the alumina can be readily made by the present invention, the particularly preferred type of catalyst suitable for use as a hydrodenitrification and/or single-stage hydrocracking catalyst comprises from about 5 to about 18 weight percent nickel and from about 15 to about 35 weight percent molybdenum, the amount of these metals being calculated as the metal and based on the weight percent of the final catalyst.

It has been noted that the actual order of mixing the chloride and/or water and/or alcohol components of the initial solution is not critical and can be done in any sequence.

The initial solution of metal chlorides is then reacted with a quantity of at least one epoxy compound, namely, an oxirane containing from 2 to 3 carbon atoms per molecule, which includes ethylene oxide, propylene oxide and epichlorohydrin. The amount of oxirane reacted can be expressed in the mol ratio of the oxirane to the number of chloride ions present in the solution. This ratio should be from about 1.0 to 5.0, although larger ratios can be employed but to no particular advantage. However, there should generally be an excess of the epoxy compound present to assure complete reaction of the reactive groups, i.e., the chlorides. The actual order of forming the solution and the addition of the oxirane is not important so long as a homogeneous mixture of the oxirane and the solution of the metal chlorides is formed before the metal components set into a hydrogel. Thus, for example, the oxirane, or mixtures of oxiranes, can be added to only one of the metal chlorides and the other metal chlorides can be added to this so long as this latter addition is done before the reaction between the epoxide and the first metal chloride results in a single-component hydrogel.

Following the addition of the oxirane, the resulting mixture will set into a hydrogel after a period of from a few seconds to several hours depending upon the concentration of the components, the temperature, and the particular solvent or combination of solvents employed. This hydrogel can be dried by conventional methods, such as by evaporation of the solvents. This dried gel will still contain about 30 weight percent water. This is then further dehydrated to convert substantially all of the components to their corresponding oxides. For example, this dehydration can be accomplished by heating from about 700° to 1000° F. at atmospheric pressures. Other dehydrating methods are known to those familiar with catalyst manufacturing techniques. This, and the subsequently described dehydration method, which is hereby defined as the conversion of a hydrogel to a gel whose components are essentially in the oxide form, produce gels having high surface areas, generally in excess of 100 or 200 m.$^2$/g. (square meters per gram).

A preferred method of dehydrating the hydrogel leads to a catalyst having particularly high catalyst activity. This method involves partially drying the hydrogel to a temperature below about 400° F., and preferably from about 200° to 350° F. The partially dried hydrogel is then further dehydrated by contact, at progressively higher temperatures, with heated hydrogen to a temperature in the range of from about 800° to 1150° F. This latter operation completes the dehydration of the hydrogel to form a gel and at the same time effects at least some reduction of the nickel and molybdenum components. It has been found that this dehydration, employing heated hydrogen, leads to a catalyst possessing a much higher activity than if the dehydration is done in the presence of air or nitrogen at the same temperatures.

The gel is then contacted with a sulfur-containing compound and hydrogen at an elevated temperature so as to substantially convert the nickel and molybdenum components to their corresponding sulfides. This sulfiding operation can be done in any conventional manner, as for example, by contact with hydrogen and hydrogen sulfide at atmospheric or superatmospheric pressures at a temperature in the range of from about 350° to 850° F., or by contact with dimethyl disulfide and hydrogen at superatmospheric pressures (i.e., 1000 p.s.i.g.), and elevated temperatures in the order of 350° to 850° F. Preferably, sulfiding temperatures are from about 500° to 750° F.

The following examples will give some indication of the efficacy of the present catalysts and the manner in which they are produced by the method of the present invention.

EXAMPLES

A number of nickel sulfide-molybdenum sulfide-alumina hydrodenitrification and hydrocracking catalysts were prepared, both according to the present method and outside the scope thereof. Except for one comparative catalyst (Catalyst I) made by conventional multiple impregnations of an alumina support, all of the other catalyst preparations employed the gelling procedure outlined above. However, certain differences in dehydration (calcining), reduction, etc., were used, and these variations point out the advantages to be gained by following certain manufacturing procedures.

Except for the impregnated Catalyst I and one other gel catalyst (Catalyst H), all of the remaining exemplified catalysts were made from hydrogels produced as follows:

Two separate quantities of hydrogel were produced by dissolving 72 grams of $NiCl_2 \cdot 6H_2O$, 192 grams of $AlCl_3 \cdot 6H_2O$, and 132 grams of $MoCl_5$ in 1800 ml. of methyl alcohol. The resulting solutions were cooled to about 35° F., and 580 ml. of propylene oxide were slowly added to each, while maintaining the solution temperatures between 35° and 55° F. After allowing the solutions to warm to room temperature, gellation occurred. The resulting hydrogels were then partially dried overnight in an air oven at 310° F. A total of 371 g. of partially dried hydrogel was obtained from the two batches. Portions of the hydrogel were then used to make the following catalysts. All compositions given are in weight percent of the total catalyst, and the nickel and molybdenum components are given in weight percent as the metals. In some cases, the catalysts were sulfided immediately after preparation, in others, not. In the latter situation, subsequent in situ sulfided within the test reactor (described hereinafter) was performed.

Catalyst A 49.5 grams of the partially dried hydrogel were placed in a glass vessel and contacted 1.25 hours at 850° F. with hydrogen. The resulting gel was then contacted with a mixture of hydrogen and $H_2S$ for 5 hours at 600° F. to substantially convert the nickel and molybdenum components of the gel to their corresponding sulfides. There was recovered 39.5 grams of catalyst having a surface area of 139 m.$^2$/g. and having a composition of 10.0 percent nickel, 31.7 percent molybdenum, with the remainder alumina ($Al_2O_3$).

Catalyst B 50.6 grams of the hydrogel were treated exactly as Catalyst A. There was recovered 39.9 grams of catayst having a surface area of 153 m.$^2$/g. and having a composition of 11.8 percent nickel, 31.7 percent modybdenum, and the remainder alumina.

Catalyst C 50.9 grams of the hydrogel were heated in straight air (in a muffle furnace) for 5 hours at 850° F. The 38.0 grams of recovered catalyst had a surface area of 84 m.$^2$/g. and a composition comprising 12.6 percent nickel, 34.0 percent molybdenum and the remainder alumina.

Catalyst D 49.6 grams of hydrogel were heated, in a muffle furnace, for 5 hours with nitrogen at 850° F. The 36.0 grams of gel catalyst had a surface area of 85 m.$^2$/g. and a composition of 12.6 percent nickel, 34.5 percent molybdenum, with the remainder alumina.

Catalyst E

Fifty-three grams of hydrogel were placed in a glass vessel and contacted with a heated mixture of hydrogen and $H_2S$, with the hyorgen rate set at about 600 ml./min. and the $H_2S$ rate being about 100 ml./min. This contacting step raised the temperature to 600° F. and this temperature was maintained there for 5 hours. The 44 grams of product had a surface area of 79 m.$^2$/g. and a composition of 10.7 percent nickel, 29.3 percent molybdenum with the remainder alumina.

Catalyst F

Fifty-three grams of hydrogel were placed in a glass vessel and heated in $H_2S$ (no hydrogen present), flowing at a rate of about 200 ml./min., to 600° F. and held there for 4.3 hours. The 49 grams of catalyst had a surface area of 45 m.$^2$/g. and a composition of 9.7 percent nickel, 27.6 percent molybdenum and the remainder alumina.

Catalyst G

Seventeen grams of hydrogel were placed in a glass vessel, heated in hydrogen to 1100° F. and held (in hydrogen) at a temperature of from about 1100° to 1145° F. for 45 minutes. The catalyst was then cooled to 600° F., and contacted with a flowing mixture of hydrogen and $H_2S$ at 600° F. for 6 hours to convert the nickel and molybdenum substantially to their sulfides. The 11 grams of catalyst had a surface area of 133 m.$^2$/g.

Catalyst H

Ninety-six grams of $NiCl_2 \cdot 6H_2O$, 256 grams of $AlCl_3 \cdot 6H_2O$, and 176 grams of $MoCl_5$ were dissolved in 2400 ml. of methyl alcohol. The resulting solution was cooled to 35° F., and to it was slowly added 770 ml. of propylene oxide while maintaining the solution temperature from about 35° to 55° F. The solution was allowed to stand at room temperature and gellation occurred. The resulting hydrogel was then partially dried for 12 hours at 320° F. The 241 grams of partially dried hydrogel was then dehydrated into a gel by calcining for 5 hours in air in a muffle furnace at 850° F., followed by an additional 5 hours at 1200° F. The resulting gel contained 12.6 percent nickel, 34.6 percent molybdenum, with the remainder alumina.

Catalyst I

This catalyst was prepared for comparative purposes only, since it was made by multiple impregnations of an alumina support, a procedure falling outside the scope of the present invention.

An alumina catalyst support was impregnated with a nickel nitrate solution and dried by gradual heating to 900° F., followed by calcining for about 8 hours at a temperature between 900° and 950° F. The nickel impregnated alumina was then impregnated twice with an ammonium molybdate solution (formed from $MoO_3$ and $NH_3$) with drying, in between impregnations and thereafter, at 900° to 950° F. for about 8 hours. The resulting calcined catalyst had a surface area of 124 m.²/g. and a composition of 6.6 percent nickel, 19.8 percent molybdenum with the remainder alumina.

In order to show the advantages of the hydrodenitrification and hydrocracking catalysts made according to the present method, their abilities to catalyze such reactions were determined as follows. In all cases, the test procedure employed was identical in all of the runs described.

The test involved charging a reactor with 16 to 42 mesh particles of catalyst. In some cases, sulfiding of the nickel and molybdenum components had already been done, whereas in other cases, only in situ sulfiding was done. Some catalysts were both sulfided outside the reactor following preparation, and then later in situ. All of the in situ sulfidings were done by heating the catalyst within the reactor up to 600° F. with flowing hydrogen at a pressure of 1100 p.s.i.g. and then contacting the catalyst with a mixture of hydrogen, to which dimethyl disulfide had been added, for one hour at 600° F.

The test feed was a straight-run Arabian gas oil of 25.4° API gravity, and which contained 600 p.p.m. (parts per million) of nitrogen (total) and 2.3 percent sulfur, the nitrogen and sulfur being present as nitrogeous and sulfurous organic compounds. The feed had A.S.T.M. D–1160 distillation points as follows:

| | °F. |
|---|---|
| Start | 622 |
| 10% | 699 |
| 30% | 715 |
| 50% | 749 |
| 70% | 802 |
| 90% | 887 |
| End point | 994 |

In all tests, runs were conducted at 800° F., a total pressure of 1110 p.s.i.g., a liquid hourly space velocity (LHSV) of 1.5, and a hydrogen rate of about 8000 standard cubic feet (s.c.f.) of hydrogen per barrel (b) of feed. Run lengths were about four hours with sample analysis based on the product recovered between the third and fourth hour of on-stream time. The analysis determines the nitrogen level of the total $C_5+$ liquid product. The relative hydrocracking activities of the catalysts were also determined. As used in these tests runs, the percent cracking is defined as the weight percentage conversion of the feed to liquid products boiling below 650° F.

The results of the test runs on Catalyst A through comparative Catalyst I are shown in the following table. The table identifies each catalyst, briefly summarizes the various external pretreatments following partial drying of the hydrogel that have been more completely described above in the section devoted to the production of the specific catalysts, indicates whether in situ sulfiding was performed (although it must be noted that all of the catalysts did have their nickel and molybdenum components substantially converted to their corresponding sulfides at some time), gives the hydrocracking percentage and, finally, the amount of nitrogen, in p.p.m., in the recovered $C_5+$ liquid product.

TABLE

| Catalyst | External Pretreatment | In Situ Sulfided | Cracking percent | Total Nitrogen, p.p.m. |
|---|---|---|---|---|
| A | $H_2$ at 850° F.; $H_2$-$H_2S$ at 600° F. | Yes | 52 | 9.5 |
| B | Same as A | No | 58 | 4.2 |
| G | $H_2$ at 1,100° F.; $H_2$-$H_2S$ at 600° F. | Yes | 52 | 12 |
| C | Air at 850° F | Yes | 42 | 29 |
| D | $N_2$ at 850° F | Yes | 40 | 9 |
| H | Air at 1,200° F | Yes | 40 | 12 |
| F | $H_2S$ at 600° F | No | 39 | 28 |
| E | $H_2$-$H_2S$ at 600° F | No | 50 | 1.5 |
| I | Calcine in air at 900°–950° F. | Yes | 41 | 15 |

From the data summarized in the table, it can be seen that a number of advantageous techniques can be employed in making the gel catalysts of the present invention.

The high hydrocracking and hydrodenitrification activities of Catalysts A, B and G must be compared to those of Catalysts C, D and H. The former three catalysts were all produced by contacting the partially dried hydrogel with hydrogen, at elevated temperatures, thereby completing the dehydration (accompanied by some metals reduction) to form the gel. Sulfiding the nickel and molybdenum components followed. However, when air or nitrogen were used to do the hydrogel dehydration, at temperatures corresponding to the catalysts dehydrated with hydrogen, the resulting catalysts, Catalysts C, D and H, were quite inferior with respect to their hydrocracking activities. Thus, the decided preference for the hydrogen dehydration-reduction step prior to sulfiding.

The differences between the hydrocracking and hydrodenitrification activities of Catalysts E and F, with the former quite superior to the latter, shows the importance of converting at least substantial portions of the nickel and molybdenum components to their sulfides by contact, at elevated temperatures, with a mixture of hydrogen and a sulfur-containing compound as opposed to contact with a sulfur-containing compound ($H_2S$) in the absence of hydrogen. The preference for such a sulfiding technique, i.e., one where hydrogen is also present with a sulfur-containing compound, is apparent from these data.

The data in the table also clearly show that a conventional impregnated catalyst has much less activity than a gel-type catalyst prepared according to the present method, even though the compositions of the catalysts are quite similar. Thus, comparative Catalyst I has a much lower hydrocracking activity than such Catalysts as A, B, G or E.

Catalysts prepared according to the present invention are particularly suitable for the hydrodenitrification and/or hydrocracking of feed stocks boiling in the range of from about 350° to 1400° F. or more, and, particularly, in the range of from about 600° to 1200° F. Since the catalysts can hydrocrack and denitrify nitrogen and/or sulfur-containing feeds, such feed stocks as straight-run or cracked distillates (including cycle oils and gas oils), deasphalted heavy petroleum fractions, topped crudes, shale or tar sand oils, are all suitable. Although nitrogen-free fractions are easily converted by these catalysts with excellent results, so, too, are those nitrogen-containing stocks that have heretofore often been required to be hydrofined prior to hydrocracking.

The hydrocracking and/or hydrodenitrification process employing these catalysts can be conducted at temperatures of from about 500° to about 1000° F., and, preferably, from about 650° to 850° F. Suitable pressures are from about 300 to 3000 p.s.i.g. or more, but the preferred range is from about 500 to 2000 p.s.i.g. LHSV's of from 0.1 to 10 are quite suitable. The reactions are also conducted in the presence of added hydrogen, the amount being at least 500 s.c.f., and normally 750 to 5000 s.c.f. per barrel of feed. Pure hydrogen or hydrogen-light-hydrocarbon mixtures, such as are recovered from catalytic reformers, are suitable as the added hydrogen source. Also, the catalysts can be employed in any type feed-catalyst contacting system, such as fixed-bed, moving bed, slurry, or fluid catalyst operations. Fixed-bed operations are generally preferred. Catalyst regeneration can be accomplished by conventional techniques employing oxygen-containing gases at elevated temperatures.

Although only specific catalysts and methods of their manufacture have been described, certain variations in the catalysts and their use can be made without departing from the spirit of the invention, and all such variations that fall within the scope of the appended claims are intended to be embraced thereby.

We claim:
1. The method for producing a gel catalyst comprising molybdenum sulfide and nickel sulfide microscopically dispersed within alumina which comprises the steps:
   (a) forming a solution comprising nickel chloride, molybdenum pentachloride and aluminum chloride,
   (b) adding to said solution from about 1.0 to 5.0 mols of at least one oxirane containing from 2 to 3 carbon atoms per molecule per mol of chloride ion, thereby forming a hydrogel,
   (c) dehydrating said hydrogel to a gel by the steps comprising:
      (1) partially drying said hydrogel at a temperature below about 400° F.,
      (2) contacting the partially dried hydrogel with heated hydrogen in the absence of a sulfur-containing compound to a temperature in the range of from about 800° to about 1150° F., thereby completing the dehydration, and
   (d) contacting the alumina-molybdenum-nickel-containing compound with hydrogen and a sulfur-containing compound at elevated temperatures to convert a substantial portion of the nickel and molybdenum components to their corresponding sulfides.

2. The method of claim 1 wherein the concentration of the nickel chloride and molybdenum pentachloride in said solution is such that the final catalyst comprises from about 5 to about 18 weight percent nickel and from about 15 to about 35 weight percent molybdenum, the amount of said metals being calculated as the metal and based on the weight percent of the final catalyst.

References Cited by the Examiner

UNITED STATES PATENTS

| | | | |
|---|---|---|---|
| 2,338,089 | 1/1944 | Bond | 252—451 |
| 2,708,187 | 5/1955 | Kearby | 252—442 |
| 2,844,542 | 7/1958 | Hinlicky et al. | 252—466 |
| 3,016,347 | 1/1962 | O'Hara | 252—466 X |
| 3,075,915 | 1/1963 | Arnold et al. | 208—216 |
| 3,114,701 | 12/1963 | Jacobson et al. | 208—254 |
| 3,223,652 | 12/1964 | Erickson et al. | 252—439 |

OTHER REFERENCES

Kearby et al.: "Aerogel Catalysis," Industrial and Engineering Chemistry, vol. 30, pp. 1082–1086 (1938).

OSCAR R. VERTIZ, *Primary Examiner.*

MAURICE A. BRINDISI, MILTON WEISSMAN,
*Examiners.*

R. M. DAVIDSON, A. GREIF, *Assistant Examiners.*